United States Patent [19]

Miutel et al.

[11] Patent Number: 4,708,977

[45] Date of Patent: Nov. 24, 1987

[54] FIRE RETARDANT PLASTICS MATERIAL

[75] Inventors: Alexander Miutel; Jerry P. Shira, both of Toronto, Canada

[73] Assignee: Phoenix Foam Inc., Toronto, Canada

[21] Appl. No.: 23,929

[22] Filed: Mar. 6, 1987

Related U.S. Application Data

[63] Continuation of Ser. No. 588,424, Feb. 21, 1984, abandoned.

[51] Int. Cl.$^4$ ................................................. C08K 5/00
[52] U.S. Cl. ...................................... 523/402; 523/505; 523/179; 521/135; 521/138; 428/920; 428/921
[58] Field of Search ................ 428/920, 921; 523/402, 523/179, 505; 521/135, 138

[56] References Cited

U.S. PATENT DOCUMENTS

| | | | |
|---|---|---|---|
| 3,553,132 | 1/1971 | Dunay et al. | 428/920 X |
| 3,714,113 | 1/1973 | Kingston | 523/505 X |
| 3,854,535 | 12/1974 | Kehr et al. | 428/920 X |
| 3,934,066 | 1/1976 | Murch | 428/921 X |
| 3,956,139 | 5/1976 | Whelan, Jr. | 428/921 X |
| 4,041,008 | 8/1977 | Makhlouf et al. | 523/505 |
| 4,043,950 | 8/1977 | Wilmsen | 428/920 X |
| 4,123,575 | 10/1978 | Wesch et al. | 428/920 X |
| 4,123,586 | 10/1978 | Betts et al. | 428/921 X |
| 4,130,458 | 12/1978 | Moore et al. | 428/921 X |
| 4,340,579 | 7/1982 | Greber et al. | 523/505 X |
| 4,440,883 | 4/1984 | Pammer | 523/402 |
| 4,486,553 | 12/1984 | Wesch | 523/402 X |
| 4,668,719 | 5/1987 | Kato et al. | 523/402 X |

OTHER PUBLICATIONS

Hawley, Condensed Chem. Dictionary, 9th Ed., p. 937.

*Primary Examiner*—Nancy A. Swisher
*Attorney, Agent, or Firm*—Fetherstonhaugh & Co.

[57] ABSTRACT

This invention relates to a plastics material with a resin binder having a combination of fusible fillers and high temperature fillers. The fusible fillers begin melting at relatively low temperatures and retain a spreaded liquidous form over a large temperature range. The high temperature fillers resist melting at high temperatures and form an insulative layer over the resin binder of the plastics cellular material.

15 Claims, No Drawings

FIRE RETARDANT PLASTICS MATERIAL

This application is a continuation of application Ser. No. 588,424 filed Feb. 21, 1984, abandoned.

This invention relates generally to plastics structural materials having a resin binder and, more particularily, it relates to the improvement of the fire retardancy features of these materials.

Plastics structural materials are commonly used in applications where there is a fire hazard. In these applications they can be dangerous because they tend to have poor fire resistance and, in addition, they tend to emit noxious gases when they burn.

These materials basically include a resin and fillers. The fillers provide a nucleation function for the material but they have provided other functions as well. They have, in the past, been selected to enhance the fire retardancy of the material.

However, prior to this invention, plastics cellular materials have not had good fire retardancy characteristics.

An example of the inadequacy of the fire retardant characteristics of these materials is found in their past use in door structures. It is practice to build panel doors with a core of a plastics foamed material. In hotel fires these doors have been found to have poor resistance to burning and, in addition, to give off toxic fumes as they burn.

It is an object of this invention to provide a plastics structural material that is of improved fire retardancy and smoke emission characteristics.

A plastics structural material according to this invention comprises a resin binder and fillers which include fusible fillers, that begin melting at relatively low temperatures to assume a spreaded liquidous form over a larger temperature range, and high temperature melt fillers, which resist melting at the melting temperatures of the fusible fillers to form an insulative layer for the said resin binder.

The invention will be clearly understood after reference to the following detailed specification.

The novelty of the invention is in the combination of the fillers and it is contemplated that the invention has application to many structural plastics materials. However, it will be described in association with a cellular or foamed plastics material. There is no intention that its application should be so limited.

Cellular or foamed plastics materials are made by assembling the ingredients into two mixtures and then combining the two mixtures into a third mixture so the they chemically react to form the resultant product.

In the case of the plastics material to be described herein, the first mixture generally comprises an unsaturated fast curing polyester resin, copolymerizeable monomers, a finely dispersed gas releasing salt, hardening accelerators, finely dispersed surfactants to allow the blowing process to rise and spread, fillers, and epoxy based vinyl esters for strength of the plastics cellular material and the second mixture generally comprises an acidic solution for reaction with the gas releasing salt as a blowing agent, and organic catalysts. These two mixtures are combined to form a third mixture that will foam in a controllable manner and cure to produce a plastics cellular foam.

The invention will be specifically described in association with the components of the mixture that go into the manufacture of a plastics cellular material wherein a polyester resin is combined with an epoxy-based vinyl ester to produce a cellular material.

The unsaturated resin component is preferably a halogenated unsaturated polyester resin but there are many other acceptable polyester unsaturated resins. The halogenated unsaturated polyester resin may be desireable for higher fire retardancy.

For fire retardancy, selection of the proper resins is based on their maximum thermal stability potential. There are several factors that should be considered in order to access the thermal stability potential. One factor is the cohesive energy; this is a measurement of the secondary bond forces of a molecule. The lower the cohesive energy, the more volatile and the lower is the melting point of the unsaturated polyester resin. Higher values of cohesive energies are usually preferrable. Another factor is bond dissociation energy; this is the energy required to break down a bond. The higher the energy required to break down the bonds of the resin binder, generally the more heat resistant it will be. Usually resins with higher dissociation energies are sought after but there are other properties of chemicals that may tilt the choice towards a different resin. Another factor, in the selection of a resin, is heat of combustion. Heat of combustion is the amount of energy that is liberated during combustion; the more energy that is liberated, the higher the flamibility is. Usually, resins with lower heat of combustion are sought after. These three factors, among others (eg. cross-link density, consideration of the co-polymerizable monomers used, consideration of the epoxy-based vinyl esters used and aromacity) should be considered together and they are not always coincidentally compatible. The same factors are considered in the selection of the monomers compounds to be referred to later.

The following cross-linking unsaturated polyester resins have been used with success in a foamed plastics material with the fire retardancy fillers of this invention:

HETRON 197—a trade mark for an unsaturated polyester resin of Ashland Chemicals—This is a highly reactive chlorinated tetra chlorophthalic resin with high chemical resistance and high heat distortion point. If this resin is used, some amount of antimony oxide should be added. This resin has the following characteristics:
(i) flame spread factor of 20
(ii) monomer content between 28–30%
(iii) viscosity of approximately 2000–2200 CPS at 25° C.

HETRON 92—a trade mark for an unsaturated polyester resin of Ashland Chemicals—This polyester unsaturated chlorinated resin can be added to HETRON 197 in order to enhance the fire-retardancy of the polyester foam. Although it has lower smoke emission than HETRON 197, it also has lowered heat resistant capabilities. This resin has the following characteristics:
(i) flame spread factor of 15
(ii) viscosity of approximately 2500–2600 CPS at 25° C.

HETRON 31—a trade mark for an unsaturated polyester resin of Ashland Chemicals—This is a highly reactive, resilient (adipic acid type) chlorinated chemical. It can be added to HETRON—197 to increase the resiliency. It has a viscosity of approximately 1500 CPS at 25° C.

Brominated HETRON 670 P—a trade mark for an unsaturated polyester resin of Ashland Chemicals—(viscosity of approximately 800 CPS at 25° C.), chlorinated resins, general purpose isopthalic resins, or rigid resins may also be used, but, for fire retardancy purposes, general purpose resins should only be added in small amounts.

The co-polymerizable monomer compound is used in the product for its cross-linking capabilities. The co-polymerizable monomer commonly used is styrene. Styrene is not the only acceptable vinyl co-polymerizable monomer chemically, but it is the most economical. Styrene may be replaced by amounts from 20 to 50% by acrylic monomers.

As those skilled in the art are aware, accelerators are required to break down the organic peroxides, which are the catalysts, to form free radicals to initiate the cross-linking process, i.e. the cross-linking of the unsaturated polymers, the epoxy vinyl esters and the monomers. In effect, the accelerators solve the problem of adding heat to the system in order to initiate the catalyzation process. There are basically two types of accelerators commonly used: they are either a tertiary amine type or an organo-metallic salt type. Three accelerators that have been found to be satisfactory are dimethyl aniline, dimethyl paratoluidine, and cobalt octoate.

Surfactants are asymetrical molecules which are used in the manufacture of the product to reduce the surface tension of the mixture by making the lipophyllic and hydrophyllic components compatible. Surfactants allow for improved distribution of the blowing agent throughout the mixture and they also prevent the foam from collapsing during curing.

Manufacturers of surfactants publish technical information about their products and, in selecting a surfactant, one examines manufacturers' specifications with a view to finding a surfactant that is effective for the particular components in the mixtures where the surfactant is required. For example, The 3M Company distribute surfactants under their trade mark FLUORAD, and under this brand they have a surfactant identified as FC-430 that is specified to have excellent effectiveness with epoxy systems and with polyester systems. This surfactant has been found to work well in this invention.

Dow Corning Corporation publish information about silicon surfactants and their DOW CORNING 198 surfactant of the nonionic silicon glycol copolymer type has been found to be satisfactory.

The surfactant identified herein as DOW CORNING 198 has been used satisfactorily, in the manufacture of a foamed plastics material as described herein, in amounts from 0.3 to 1.0 w.p. (to 100 w.p. of unfilled polymers and monomers).

The FC-430 surfactant of 3M Company has also been used successfully with this invention in amounts from 0.3 to 1.0 w.p. (to 100 w.p. of unfilled polymers and monomers).

Any surfactant capable of reducing the surface tension in a mixture to provide for improved distribution of blowing may be used in the manufacture of a foamed plastics material as selected by try and test methods of the prior art. However, with the unsaturated polyester resin foam described herein, the two specific surfactants noted are of unique utility and get an unexpectably good result where the epoxy-based vinyl ester is used.

In the herein described product, to the forgoing usual constituents of the first mixture are added an epoxy-based vinyl ester to increase the strength of the resin binder.

Epoxy-based vinyl esters are vinyl esters with epoxy backbones and they are used in the foamed material described herein.

Unlike unsaturated polyester resins, epoxy-based vinyl esters have short chains and there are re-active double bonds located at the ends of each molecule. This structure allows for a more complete polymerization with the monomers and polyester resins.

Epoxy-based vinyl esters are vinyl esters with epoxy backbones.

Unlike unsaturated polyester resins, epoxy-based vinyl esters have short chains and there are re-active double bonds located at the ends of each molecule. This structure allows for a more complete polymerization with the monomers.

All epoxy-based vinyl esters usually have low viscosity (ie approximately in the range from 350 to 1000 CPS at 25° C.).

The structure of epoxy-based vinyl esters may be represented by the following configuration:

where the letter V represents a vinyl group, E represents an ester group, and EC represents the epoxy component.

The following is an example of a configuration for a possible epoxy-based vinyl ester:

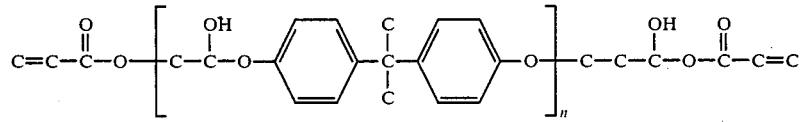

The reactive sites are located at the double bonds of the two vinyl-ended molecule.

Some epoxy-based vinyl esters that have been used successfully are:
(i) DEREKANE—510N—a trade mark of Dow Chemical Canada Inc.: This epoxy-based vinyl ester imparts fire retardancy with high heat distortion.
(ii) DEREKANE—510A—a trade mark of Dow Chemical Canada Inc.: This epoxy-based vinyl ester imparts a high oxygen value and low flame spread.
(iii) DEREKANE—XD80804—a trade mark of Dow Chemical Canada Inc.: This is a rubber modified epoxy-based vinyl ester that imparts resiliency.
(iv) HETRON 922—a trade mark of Ashland Chemicals: This epoxy-based vinyl ester has low viscosity of approximately 400 cps at 25° C. and imparts high strength characteristics. This epoxy-based vinyl ester, in itself, is not fire retardant.

Almost any plastics foam material has a filler and the selection suitable to the end use of the particular foam is, in the case of many fillers, skill in the art. In addition to the normal type of fillers, fusible fillers and high temperature melt fillers operate to provide fire retardation when the material is subjected to fire.

These special fillers give superior fire retardancy characteristics to the manufactured foamed plastics material.

The manufactured foamed product is, for example, used as the core material in a wood panel door. In case of fire, the fire first reaches the wood panel and it burns rather quickly. Fire then attacks the plastics core. The heat of the fire first affects the fusible fillers in the portion of the plastics material near the surface. These fillers are selected to melt at a temperatures beginning less than 950° C. They preferably begin to become liquid in the 360° to 650° C. range; they assume a spreaded liquidous form, which is a barrier to oxygen transfer to the combusting polymer and which they maintain as the temperature increases above 950° C. They maintain this form over a large elevated temperature range. In this form they spread over the resin bonds and protect them from the affects of the advancing temperature due to the fire. They preferably are selected to melt at varying temperatures to supply greater protection as the heat increases. Some may be liquidous at temperatures as low as 250° C.

As these fusible fillers become liquidous and as the temperature advances upwardly, the surface resin becomes carbonized and covered with a liquidous layer. The high temperature melt fillers mix with the surface carbonized resin to provide further insulative layer against the advancement of the burning effect of the fire on the foamed plastics core. These high temperature melt fillers retain their solid form and have a melting point above 950° C.

It is also desirable to have an early carbonization of the surface area of the plastics material as it is subjected to fire, and, to achieve this, carbonization fillers are added. These fillers promote carbonization of the surface area on the occurence of fire to provide a ready base for intermixing with the high temperature melt fillers.

Thus, in the case of exposure to fire, the high temperature melt fillers, which provide an insulative layer of solid over the resin binder, are complemented by the fusible fillers, whose spreaded liquidous layer seals cracks, pores and like areas of exposure of the resin binding as well as wetting the outer carbonized layer of the resin binding and covering the high temperature fillers themselves, to provide increased fire resistance.

Leadless borax-type powdered glass is a finely ground powdered glass that has a low melting point approximately between 700°-750° C. It has been successfully used, as a fusible filler, in quantities between 0-25 w.p. (per 100 w.p. unfilled polymers and monomers).

Sodium metavanadate is a finely ground anhydrous salt that, as a fusible filler, very effectively spreads a liquidous layer; just as important, it also contributes to the homogeneous spreading of all the melted compounds. Sodium metavanadate is especially effective in wetting the carbon layer of the resin binding. Sodium metavanadate has a low melting point of approximately 300°-350° C. and it has been successfully used as a fusible filler in quantities between 0-5.0 w.p. (per 100 w.p. unfilled polymers and monomers).

Boric acid is a filler which begins to release chemically bonded water when the increasing temperature reaches approximately 185° C., releasing 1.0 mole of water per mole of boric acid. The byproduct, other then water, is metaboric acid; molecules of metaboric acid will commence, at approximately 250° C. to combine in pairs to release, for each pair, one mole of water and mole of boric oxide. Boric oxide is a fusible filler which melts at approximately 450° C. and will remain melted at temperatures above 1400° C. Boric acid has been successfully used, as a fusible filler, in quantities of 12 to 25 w.p. (per 100 w.p. unfilled polymers and monomers).

Zinc borate, in its unheated form, is a uniform white powdered crystalline material and has a melting point of approximately 500° C. As a fusible filler, it has been successfully used in amounts from 3.0 to 8.0 w.p. (per 100 w.p. unfilled polymers and monomers).

These fillers then are capable of maintaining a spreaded liquidous form over a substantial temperature range under conditions of fire. They remain in a melted state and spread over the heated surface of the resin binder to cover it with a thin homogeneous layer. Their liquidity acts as a physical barrier to protect the resin binder from oxidation under conditions of high temperature encountered in fire.

The high temperature fillers include refractory materials with high temperature resistance that do not decompose until being subjected to elevated temperatures in the range of 1200° C. up. Chemically these compounds may be pure oxide compounds such as hydrated aluminum oxide or fibrous and non-fibrous metal silicates.

A fibrous filler consisting of essentially calcium metasilicate and sold under the trade name NYAD 325 (Wollastonite), made by Prescott & Company (Canada) Ltd., has been found satisfactory as a high temperature melt filler. This product is about 98% calcium metasilicate with the balance being substantially ferrous and aluminum oxide. It melts at about 1540° C. The filler is used advantageously from 5.0 to 25.0 w.p. (per 100 w.p. of unfilled polymers and monomers).

Another refractory filler that has been used, with success, is sodium potassium aluminum silicate without free silica or quartz. It melts at a temperature of over 1400° C. Its finest particles will provide good nucleation properties. Such a refractory filler sold under the trade mark of NEPHELINE SYENITE A-400 by INDUSMIN LTD. is a workable filler and provides a good non-reinforcing filler when used in formulations from 5.0 to 25.0 w.p. (to 100 w.p. of unfilled polymers and monomers).

Another high temperature filler is hydrated aluminum oxide. At temperatures between approximately 220° C. and 600° C., water molecules are released. The aluminum oxide, which is left over after this water loss, has excellent heat resistance and a melting point above 1600oC This filler is very effective when used in formulatioins from 5.0 to 25.0 w.p. (to 100 w.p. of unfilled polymers and monomers).

Other high temperature fillers include mineral wool, which chemically is calcium magnesium (diopsid) silicate; this high temperature filler has a melting point of approximately between 1260° C. to 1280° C.

Carbonization accelerating fillers are also preferably used. these fillers accelerate the formation of a carbon layer on the polymer binders under conditions of fire with which the high temperature refractory filler can combine. Ferric oxide with zero to three moles of water per mole of ferric oxide is a carbonization acclerating filler; this particular filler can release chemically bonded water in a quantity relative to the mole composition of water when it reaches a temperature of approximately 500° C. Ferric oxide, itself, is a high temperature filler, which melts at approximately 1560° C. It is an effective smoke suppressant especially in the presence of methyl metacrylate, which is often included in the mix then fire retardancy is a factor. Ferric oxide also acts as an effective carbonization accelerating filler and promotes the carbonization of the resin binder for combination with the high temperature melt fillers and the protection of the inner parts of the foam when heat is being applied.

A further carbonization accelerator filler is ferric chloride.

Continuing with the general disclosure of the manufacture of a foamed plastics material, the second mixture customarily includes: an acidic solution which will react with the gas-releasing salt of the the first mixture as a blowing agent; and organic catalysts.

There are many acceptable acidic solutions.

The acidic solution should be adjusted to compliment the resinous composition. When the PH of the acid is modified, the surfactancy and fire-retardancy of the final product can be modified through the introduction of the inorganic salt solution.

The following aqueous solution has been successfully used, in this invention, in the following ranges of proportions:

| | |
|---|---|
| water | 5.0 to 10.0 w.p. |
| citric acid | 1.0 to 7.0 w.p. |
| acetic acid | 0.5 to 3.0 w.p. |

With the dilution of the acidic solution, a greater quantity of water is introduced into the mix; excessive amounts of water are not desireable. On the other hand, strong acid concentration involves acid odor. The following ratio has been found not to produce acetic acid odour and introduce an acceptable amount of water:

| | |
|---|---|
| water | 10.0 w.p. |
| citric acid | 4.0 w.p. |
| acetic acid | 1.0 w.p. |

Triethyl phosphate with or without citric-acidic acid can also been used. It has been found that triethyl phosphate allows for a more even distribution of the gaseous bubbles during the blowing process.

The second mixture also includes an inorganic salt solution as buffer.

An inorganic salt will aid in lowering the surface tension of the foaming cellular plastics material and increase the fire retardancy. The use of an inorganic salt, in this process, is well-known in the art. An inorganic salt that has been successfully used, in this invention, is ammonium sulfamate solution that is 30% aqueous (a concentration close to saturation).

The acidic solution and the inorganic salt solution can be mixed together in the following proportions, by weight, in order to attain a suitable foam:

| | | |
|---|---|---|
| citric - acetic solution | 4-8 w.p. | (per 100 w.p. unfilled polymers and monomers) |
| ammonium sulfamate | 3-6 w.p. | (per 100 w.p. unfilled polymers and monomers) |

The second mixture, prepared in the manufacture of a plastics foam, usually includes the organic catalysts. Catalysts are required to cure the vinyl-copolymerizable resins, the epoxy-based vinyl ester and the monomers; they accomplish this after being activated by accelerators.

Benzoyl peroxide has been used with success as the main catalyst; it is very reactive in ambient temperatures. Benzoyl peroxide has been effectively used in amounts from 3.8 to 5.0 w.p. (per 100 w.p. unfilled polymers and monomers).

The following are specific examples of concentrations of components that have been used to make a foamed plastics material with fire retardant properties according to this invention:

EXAMPLE ONE

| First Mixture | |
|---|---|
| HETRON (epoxy based vinyl ester) | 70.0 w.p. |
| HETRON - 197 (polyester resin) | 23.0 w.p. |
| methyl metacrylate (monomer) | 7.0 w.p. |
| FC-430 (surfactant) | 0.7 w.p. |
| DC-198 (surfactant) | 0.4 w.p. |
| sodium bicarbonate (gas releasing salt and nucleation filler) | 18.0 w.p. |
| dimethyl aniline (accelerator) | 0.25 w.p. |
| dimethyl paratoluidine (accelerator) | 0.10 w.p. |
| cobalt napthenate (accelerator) | 0.15 w.p. |
| antimony trioxide | 5.0 w.p. |
| calcium metasilicate | 10.0 w.p. |
| hydrated ferric oxide | 3.0 w.p. |
| zinc borate | 3.0 w.p. |
| hydrated aluminum oxide | 30.0 w.p. |
| sodium potassium aluminum silicate | 15.0 w.p. |
| boric acid | 14.0 w.p. |
| powdered borax glass | 15.0 w.p. |
| sodium metavanadate | 5.0 w.p. |
| Second mixture | |
| aqueous acidic solution* | 10.0 w.p. |
| benzoyl peroxide (catalyst) | 5.0 w.p. |

*The aqueous solution is composed of 1.0 w.p. acetic acid, 4.0 w.p. citric acid, 10.0 w.p. water to make up 8.0 w.p. of the aqueous acidic solution and ammonium sulfamate 30% aqueous solution making up 2.0 w.p. of the 10.0 w.p. aqueous acidic solution.

This resulting plastics cellular material is a foam with high fire resistance. It has a density of between 25 to 26 pounds per cubic foot and its applications include door filler and wall panels.

SECOND EXAMPLE

| First Mixture | |
|---|---|
| HETRON - 922 (epoxy based vinyl ester) | 70.0 w.p. |
| HETRON - 197 (polyester resin) | 25.0 w.p. |
| methyl metacrylate (monomer) | 5.0 w.p. |
| FC-430 (surfactant) | 0.7 w.p. |
| DC-198 (surfactant) | 0.4 w.p. |
| sodium bicarbonate (gas releasing salt and nucleation filler) | 12.0 w.p. |
| dimethyl aniline (accelerator) | 0.25 w.p. |
| dimethyl paratoluidine (accelerator) | 0.10 w.p. |
| cobalt napthenate (accelerator) | 0.20 w.p. |
| antimony trioxide | 3.0 w.p. |
| hydrated aluminum oxide | 45.0 w.p. |
| boric acid | 0.5 w.p. |
| fumed silica gel | 0.5 w.p. |
| Second mixture | |
| aqueous acidic solution* | 4.0 w.p. |
| benzoyl peroxide (catalyst) | 5.0 w.p. |

*The aqueous solution is composed of 1.0 w.p. acetic acid, 4.0 w.p. citric acid, 10.0 w.p. water to make up 3.5 w.p. of the aqueous acidic solution and ammonium sulfamate 30% aqueous solution making up 0.5 w.p. of the 4.0 w.p. aqueous acidic solution.

This resulting plastics cellular material is a fire-retardant foam, but because of the relative quantity and combination of fillers, it has lower fire resistance than example one. It has a density of between 30 to 32 pounds per cubic foot and its applications include bathtubs and shower stalls.

EXAMPLE THREE

| First Mixture | |
|---|---|
| HETRON (epoxy based vinyl ester) | 50.0 w.p. |
| HETRON - 197 (polyester resin) | 43.0 w.p. |
| methyl metacrylate (monomer) | 7.0 w.p. |
| FC-430 (surfactant) | 0.5 w.p. |
| DC-198 (surfactant) | 0.5 w.p. |
| sodium bicarbonate (gas releasing salt and nucleation filler) | 16.0 w.p. |
| dimethyl aniline (accelerator) | 0.25 w.p. |
| dimethyl paratoluidine (accelerator) | 0.10 w.p. |
| cobalt napthenate (accelerator) | 0.15 w.p. |
| antimony trioxide | 5.0 w.p. |
| hydrated ferric oxide | 5.0 w.p. |
| calcium metasilicate | 5.0 w.p. |
| hydrated aluminum oxide | 20.0 w.p. |
| boric acid | 10.0 w.p. |
| powdered borax glass | 10.0 w.p. |
| sodium metavanadate | 3.0 w.p. |
| Second mixture | |
| aqueous acidic solution* | 12.0 w.p. |
| benzoyl peroxide (catalyst) | 5.0 w.p. |

*The aqueous solution is composed of 1.0 w.p. acetic acid, 4.0 w.p. citric acid, 10.0 w.p. water to make up 10.0 w.p. of the aqueous acidic solution and ammonium sulfamate 30% aqueous solution making up 2.0 w.p. of the 12.0 w.p. aqueous acidic solution.

This resulting plastics cellular material is a fire-retardant foam. Because of the relative quantities and selection of fillers used, this foam has less fire resistance than example one but more fire resistance than example two. It has a density of between 10 to 12 pounds per cubic foot and its application include structural foam.

The embodiments of the invention in which an exclusive property or privilege is claimed are defined as follows:

1. A plastics material with a resin binder, that includes co-polymerizable monomer and an epoxy based vinyl ester in its composition, having: a combination of fillers said combination of fillers including fusible fillers that begin melting at relatively low temperatures and retain a spread liquidous form over a large temperature range; said combination of fillers also including high temperature fillers that resist melting at temperatures substantially higher than the melting point of the fusible fillers; said fusible fillers being added in sufficient proportion to the said high temperature fillers such that, in response to the heat of fire, the spread liquid from the fusible fillers in combination with the high temperature fillers forms an insulative layer over the said resin binder; said combination of fillers including fillers capable of releasing chemically-bonded water when heated.

2. A plastics material as claimed in claim 1 wherein said high temperature fillers include carbonization accelerating fillers, that accelerate the insulative carbon layer to form on the said resin binder.

3. A plastics material as claimed in claim 2 wherein a said carbonization accelerating filler is ferric chloride.

4. A plastics material as claimed in claim 2 wherein the said high temperature fillers include ferric oxide with from zero to three moles of water per mole of ferric oxide.

5. A plastics material as claimed in claim 2 wherein a said fusible filler is zinc borate.

6. A plastics material as claimed in claim 1 wherein a said fusible filler is a finely powdered leadless borax glass.

7. A plastics material as claimed in claim 1 wherein a said fusible filler is sodium meta-vanadate.

8. A plastics material as claimed claim 1 wherein a said high temperature fillers is natural calcium metasilicate.

9. A plastics material as claimed in claim 1 wherein a said high temperature filler is sodium potassium aluminum silicate.

10. A plastics material as claimed in claim 1 wherein a said high temperature fillers is a hydrated aluminum oxide.

11. A plastics material as claimed in claim 1 wherein the said high temperature fillers include ferric oxide with from zero to three moles of water per mole of ferric oxide.

12. A plastics material as claimed in claim 1 wherein a said fusible filler is zinc borate.

13. A plastics material as claimed in claim 1 wherein a said fusible filler is boric acid.

14. A plastics material as claimed in claim 1 wherein a said high temperature fillers is calcium magnesium (diopsid) silicate.

15. A plastics material as claimed in claim 1 wherein a said high temperature filler is hydrated aluminum oxide and a said fusible filler is zinc borate.

* * * * *